United States Patent [19]
Arnold et al.

[11] 3,777,772
[45] Dec. 11, 1973

[54] FLAP OPENING INFLATOR SEAL ARRANGEMENT

[75] Inventors: Thomas E. Arnold, Goleta; Roy D. Plumer, Santa Barbara, both of Calif.

[73] Assignee: General Motors Corporation, Detroit, Mich.

[22] Filed: Sept. 11, 1972

[21] Appl. No.: 287,812

[52] U.S. Cl................ 137/68, 220/47, 222/3, 280/150 AB
[51] Int. Cl............................................. F16k 17/40
[58] Field of Search................................. 222/3, 5; 280/150 AB; 137/68–71; 220/47, 89 A

[56] References Cited
UNITED STATES PATENTS

| | | | |
|---|---|---|---|
| 2,553,267 | 5/1951 | Nedoh | 220/89 A |
| 3,109,553 | 11/1963 | Fike et al. | 137/68 X |
| 3,339,800 | 9/1967 | Sustrich et al. | 222/5 |
| 3,528,681 | 9/1970 | Ekstrom | 280/150 AB |

Primary Examiner—Martin P. Schwadron
Assistant Examiner—Richard Gerard
Attorney—W. E. Finken et al.

[57] ABSTRACT

An inflator for a vehicle inflatable occupant restraint cushion includes an outlet having a generally cylindrical bore and a radial end wall, with the edge of the bore adjacent the end wall being chamfered to provide a radially angular juncture wall. A domed seal includes a flange seating on the end wall and secured thereto. The dome of the seal projects within the bore and closes the opening of the bore. The flange overlies the angular juncture wall and defines therewith a continuous circumferential recess of angular cross section. A discontinuous groove in the flange opens to the recess. A flexible shaped charge coterminous in extent with the groove fits within the recess. When the charge is fired, the dome separates from the flange along the groove and is swung relative to the flange by the flow of pressure fluid through the bore of the inflator.

2 Claims, 3 Drawing Figures

PATENTED DEC 11 1973
3,777,772
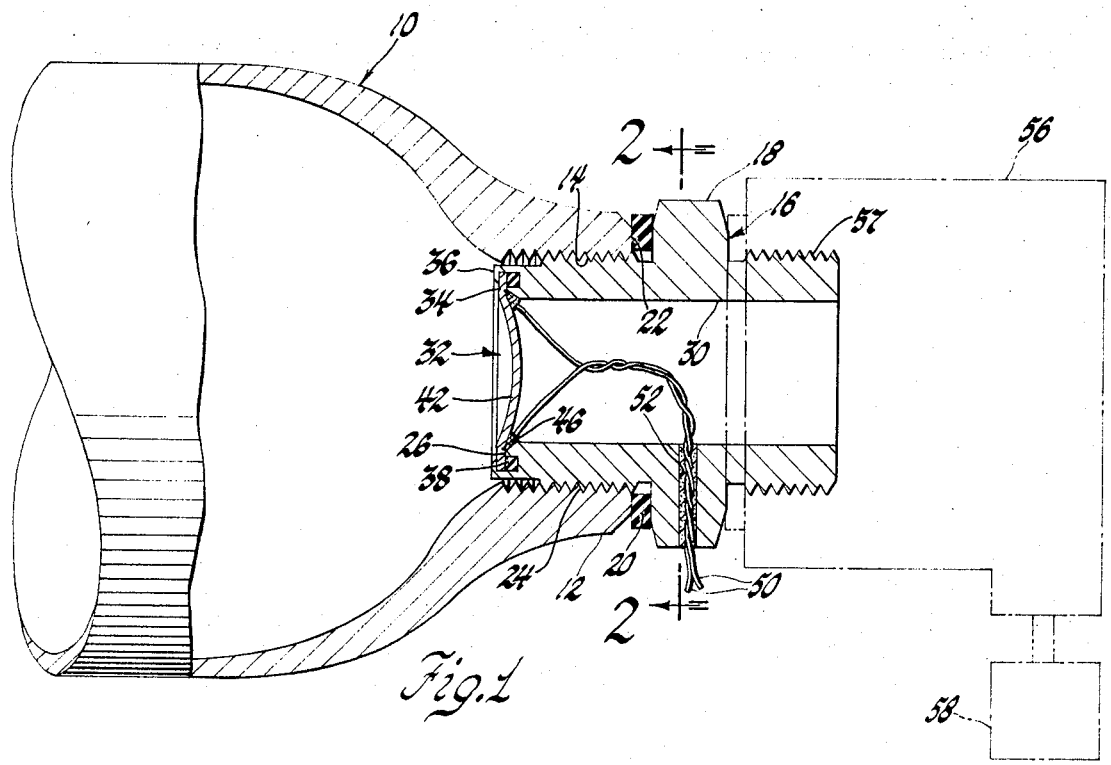
Fig.1
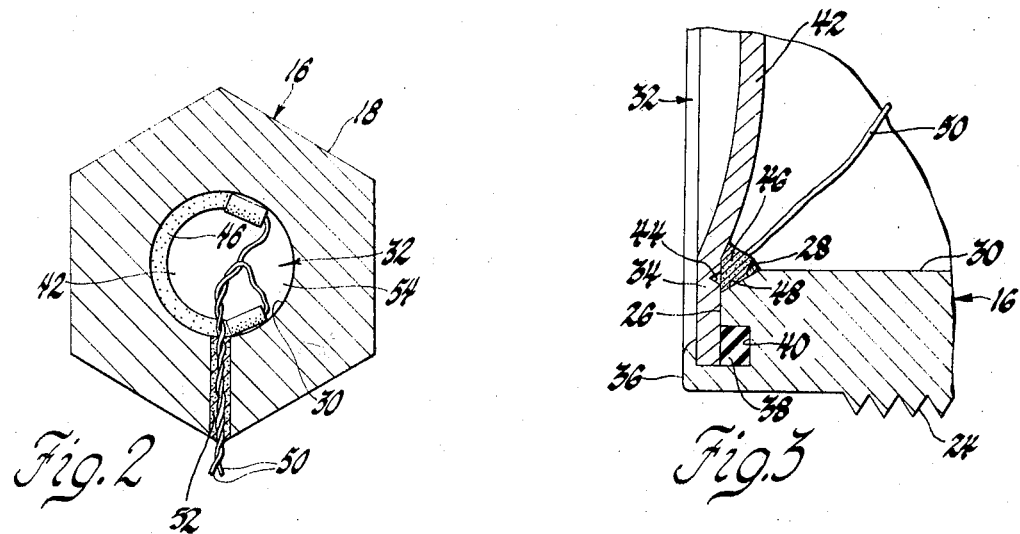
Fig.2
Fig.3

FLAP OPENING INFLATOR SEAL ARRANGEMENT

This invention relates generally to sealing arrangements for pressure vessel type inflators adapted for use with vehicle occupant restraint cushions, and more particularly to such a seal wherein a portion of the seal is severed from the remainder thereof to provide an integrally hinged flap moved relative to the remainder of the seal by the release of pressure fluid from the inflator.

Generally the flap is provided by coining a discontinuous groove in the flange of a domed seal. This flange overlies a chamfered wall of the inflator outlet and defines with such wall a recess. A flexible shaped charge within the recess is coterminous in extent with the groove, and when fired, severs the dome from the flange along the groove. The ungrooved portion of the flange provides the integral hinge between the resultant flap and the remainder of the seal. The flow of pressure fluid through the inflator outlet swings the flap to an out-of-the-way position to permit the pressure fluid to flow to the cushion.

Flexible shaped charges for severing flaps from pressure vessels are well known in the art. However, such charges in the past have been required to be of high charge weight in order to sever the flap and difficulty has been experienced in accurately locating such charges on the wall of the pressure vessel. In the sealing arrangement of this invention, the charge is of relatively low charge weight since it cooperates with a discontinuous groove to sever a flap from a diaphragm type seal. Additionally, the charge is located within a recess provided by the outlet of the inflator and the seal so that it can be accurately positioned with respect to the groove and easily retained in place.

The primary feature of this invention is that it provides an improved sealing arrangement for an inflator wherein a flexible shaped charge and a coined groove in a diaphragm type seal cooperatively function to sever the center portion of the diaphragm and integrally hinge this center portion to the remainder of the diaphragm for movement relative thereto to an open position to permit the flow of pressure fluid from the inflator to an inflatable occupant restraint cushion.

This and other features of the invention will be readily apparent from the following specification and drawings wherein:

FIG. 1 is a partially broken away partial view of an inflator embodying a sealing arrangement according to this invention;

FIG. 2 is a sectional view taken generally along the plane indicated by line 2—2 of FIG. 1; and FIG. 3 is an enlarged view of a portion of FIG. 1.

Referring now particularly to FIG. 1, an inflator 10 is shown as a pressure vessel containing pressure fluid. The pressure vessel is conventional and the details thereof are therefore not shown. The outlet 12 of the pressure vessel includes an internally threaded bore 14. A bushing 16 has one externally threaded end portion threaded into the bore 14. A radial flange 18 of the bushing of hexagonal shape, FIG. 2, engages a sealing washer 20 to compress this washer against the radial end wall 22 of the outlet 12 and thereby provide a seal between the bushing and the inflator. The externally threaded one end portion 24 of the bushing 16 includes an end wall 26, FIG. 3, which is joined by an angular juncture wall 28 with the cylindrical inner wall 30 of the bushing 16 which provides an outlet bore communicating with the interior of the inflator 10.

A dome type diaphragm or seal 32 includes a peripheral flange 34 which seats on the end wall 26 of the bushing portion 24. A continuous or discontinuous peripheral flange 36 of the bushing portion 24 is staked over the seal flange 34 to mount the seal on the bushing. An O-ring 38 received in a continuous bore 40 opening to wall 26 seals flange 34 to wall 26.

The dome 42 of the seal projects within the bore 30 and closes the opening of this bore. The flange 34 is provided with a coined groove 44, FIG. 3, in the portion of the flange which overlies or faces the wall 28. Groove 44 is discontinuous and extends for approximately 315°. It creates a stress riser condition in flange 34. A conventional flexible shaped charge 46, coterminous in extent with the groove 44, is received within the recess 48 defined by the wall 28 and the portion of the flange 34 overlying this wall. The charge is electrically fired in a conventional manner through suitable inertial type or acceleration type sensors as is well known to those versed in the art of inflatable occupant restraint systems. Conductors 50 extend outwardly through a bore 52 of flange 18 to fire the charge. Bore 52 is conventionally sealed.

When the charge 46 is fired, the charge and the groove 44 sever the dome 42 of the seal from the flange 34 along the groove 44. Since this groove is discontinuous, the ungrooved portion 54, FIG. 2, of the flange provides an integral hinge hinging the resultant dome or flap to the seal flange. The severing is, of course, aided by the pressure of the fluid in the pressure vessel 10. The flow of pressure fluid through the bore 30 swings the dome portion inwardly as the fluid flows to the cushion.

As schematically indicated in FIG. 1, a suitable manifold 56 threaded on the other end portion 57 of the bushing 16 communicates the bore 30 with an inflatble occupant restraint cushion 58.

Thus, the invention provides an improved sealing arrangement for an inflator of an inflatable occupant restraint system.

We claim:

1. The combination comprising, an inflator providing a source of pressure fluid and having an outlet including a generally annular inner wall joined by a radially angular juncture wall with a radial end wall, a seal having a peripheral flange seating on the end wall and integrally joined to a center portion by a juncture wall portion provided with a discontinuous groove, the center portion closing the opening of the inner wall of the outlet and the juncture wall portion and juncture wall of the outlet cooperatively defining a circumferentially continuous recess, means securing the seal to the outlet, and a flexible shaped charge located within the recess and being generally coterminous with the groove, the charge and groove cooperatively severing the center portion of the seal from the seal flange along the discontinuous groove, the ungrooved juncture wall portion of the seal providing an integral hinge swingably securing the center portion to the flange for movement relative thereto under the pressure of fluid released from the inflator and flowing through the inner wall of the outlet.

2. The combination comprising, an inflator providing a source of pressure fluid and having an outlet including a generally cylindrical bore joined by a radially angular juncture wall with a radial end wall, a seal having a radial flange seating on the radial end wall and integrally joined to a center dome closing the opening of the inner wall of the outlet, the seal flange including a discontinuous groove adjacent the dome and overlying the juncture wall of the outlet to cooperatively define therewith a circumferentially continuous recess, the groove opening to the recess, means securing the seal flange to the outlet, and a flexible shaped charge located within the recess and being generally coterminous with the extent of the groove, the charge and groove cooperatively severing the seal dome from the seal flange along the discontinuous groove, the ungrooved portion of the seal flange providing an integral hinge swingably securing the dome to the flange for movement relative thereto under the pressure of fluid released from the inflator and flowing through the bore of the outlet.

* * * * *